United States Patent [19]

Tupolev et al.

[11] 3,955,781

[45] May 11, 1976

[54] SUPERSONIC AIRCRAFT WITH THE ENGINES DISPOSED UNDER THE DELTA WING MIDDLE PORTION

[76] Inventors: Andrei Nikolaevich Tupolev, Leninsky prospekt, 14; Alexei Andreevich Tupolev, ulitsa Stanislavskogo, 15, kv. 25; Iosif Fomich Nezval, ulitsa Chkalova, 25, kv. 32; Georgy Alexeevich Cheremukhin, Krasnokazarmennaya, 9, kv. 174; Alexandr Emmanuilovich Sterlin, ulitsa K. Marxa, 20, kv. 266; Valentin Ivanovich Bliznjuk, ulitsa II Parkovaya, 37, korpus 3, kv. 46, all of Moscow; Alexandr Leonidovich Pukhov, ulitsa Gagarina, 35, kv. 47, Zhukovsky Moskovskio oblasti; Georgy Petrovich Svischev, ulitsa Kirova, 40-a, kv. 26; Georgy Sergeevich Bjushgens, ulitsa Suvorovskaya, 1/2, kv. 26, both of Moscow; Vitaly Georgievich Mikeladze, ulitsa Mayakovskogo, 17, kv. 20, Khukovsky Moskovskoi oblasti, all of U.S.S.R.

[22] Filed: Apr. 29, 1974

[21] Appl. No.: 471,713

Related U.S. Application Data

[63] Continuation of Ser. No. 18,166, March 10, 1974, abandoned.

[52] U.S. Cl. .................................. 244/13; 244/119
[51] Int. Cl.² ........................................... B64C 1/00
[58] Field of Search ................ 244/13, 15, 55, 119, 244/120, 118, 106, 118 R

[56] References Cited

UNITED STATES PATENTS 2,623,720   12/1952   Fortunato ........................... 244/106

FOREIGN PATENTS OR APPLICATIONS 674,433   4/1939   Germany ........................... 244/119

OTHER PUBLICATIONS

Jame's All the World's Aircraft, 1968–1969, pp. 433–434, "Tupolev Tu–144."
Jame's All the World's Aircraft, 1969–1970, pp. 498–499, "Tupolev tu–144."
Jame's All the World's Aircraft, 1969–1970, pp. 403–404, "Northrup F–5A."
Jame's All the World's Aircraft, 1964–1965 p. 267, "North American RA–5C."

Primary Examiner—Trygve M. Blix
Assistant Examiner—Galen L. Barefoot
Attorney, Agent, or Firm—Holman & Stern

[57] ABSTRACT

A supersonic aircraft in which the engines are disposed under the middle portion of a delta wing and the contour of the nose portion except for the front end of the fuselage is defined essentially by two arcs of different circumference, the circumferences being disposed one above the other, with the lower circumference being described by a greater radius than the radius of the upper circumference, a cabin floor at the intersection of these circumferences, the nose portion at its front end including such end being inclined downwardly for thereby decreasing the height of the aircraft and increasing the number of seats in a row, and engines under the middle portion of the wing.

2 Claims, 4 Drawing Figures

SUPERSONIC AIRCRAFT WITH THE ENGINES DISPOSED UNDER THE DELTA WING MIDDLE PORTION

This is a continuation of appliction Ser. No. 18,166, filed Mar. 10, 1974, now abandoned.

BACKGROUND OF THE INVENTION

The present invention relates to a supersonic aircraft in which the engines are disposed under a delta wing middle portion and, more particularly to improvements in the nose portion of the fuselage of the aircraft enabling the aircraft to be used under the conditions of an endurance flight at a supersonic speed.

PRIOR ART

As a rule, the contour of the cross-section of the nose portion of the fuselage of the known supersonic aircraft has the shape of a circle (cf. the Journal "Flying Review International," vol. 20, No. 4, January 1965, page 21). With the nose portion being of this shape, the aerodynamic center is considerably shifted when switching from the subsonic speed to the supersonic speed. This shape also brings about a decrease in the aircraft directional stability and, as a result thereof, the area of the fin has to be increased. In addition, this disturbs the united vortex system of the fuselage along with the wing.

To eliminate these difficulties, use is made of aerodynamic edges arranged along the sides of the nose portion of the fuselage from the nose to the wing (ibid.). However, the great surface of these edges decreases the maximal aerodynamic ratio of the aircraft.

In order to provide for better operating conditions of the air intake ducts, with the engines disposed under the wing middle portion, a nose portion having a cross-section of a circular shape must be mounted above the wing. With the above described aircraft, the surface of friction is increased, and the boundary layer bleed of the fuselage and the wing also increases. Simultaneously, the size of the aircraft along the vertical line likewise becomes greater, and this is particularly the situation at the point of disposition of the air intake ducts.

Moreover, with the air intake ducts disposed before the aircraft e.g., to provide for a higher directional stability of the aircraft, the area of the fin must be increased, thereby resulting in a greater resistance on the part of the aircraft. In addition, the weight of the aircraft increases.

To increase the pilot's field of vision, the cockpit canopy of such aircraft protrudes considerably above the nose portion of the fuselage, which substantially increases the resistance of the aircraft.

OBJECT AND SUMMARY OF THE INVENTION

It is an object of the present invention to eliminate the above and other difficulties existing in the art.

The main object of the present invention is to provide a supersonic aircraft having the engines disposed under a delta wing middle portion, in which the shape of the nose portion of the fuselage provides for good operating conditions of the air intake ducts, and the pilot's field of vision is sufficiently great to allow take-off and landing.

In accordance with the present invention, this object is accomplished in that the contour of the cross-section of the nose portion of the fuselage, except for its end portion, is essentially two arcs of different circumferences, which are disposed one above the other, the lower arc being described by a greater radius than the upper arc, and with the cabin floor serving as a boundary between the arcs.

As a result thereof, the cross-section is of an ellipse-like shape, with the width exceeding the height, whereby, the bearing characteristics of the fuselage are improved, and the aerodynamic center of the aircraft is shifted, but insignificantly when switching from the subsonic speed to the supersonic speed. Furthermore, the conditions of the operation of the air intake ducts are improved to such an extent that there is no need to dispose the nose portion of the fuselage above the wing.

The number of seats in a row is of great importance for the passenger aircraft, and the present invention provides for the disposition of five seats in a row instead of four, with the cross-sectional area being the same. As a result thereof, the length of the cabin accommodating the same number of passangers is smaller. A certain non-uniformity in the forces acting upon the upper and lower portions of the cross section is resisted by the cabin floor which serves as a boundary between such portions.

As the degree of the above non-uniformity of the forces is proportional to the ratio between the radii of the circumferences, it is expedient to make the radius of the lower arc to exceed the radius of the upper arc by not more than 1.7 times, and, to be more precise, in the range of 1.3 to 1.7, in which the smaller limit refers to the front boundary of the nose portion and the greater limit to its rear boundary.

To provide for uniform conditions of the vortex formation, to raise the bearing characteristics of the wing, and the longitudinal and directional stabilities, it is expedient to make the line of intersection of the arcs of the circumferences at every side smoothly fair into the wing leading edge.

To increase the pilot's field of vision from the canopy which does not protrude above the fuselage, it is desirable to incline the longitudinal axis of the section of the nose portion of the fuselage at its end, including the latter, downwards relative to the fuselage base line to make an inclination angle equal to the upwash angle, i.e. 4°–6°.

Since during taking-off and landing the aircraft is disposed at an angle relative to the horizon, the angle of visibility decreases and to eliminate this difficulty, it is advisable to make the nose portion of the fuselage as a separate component which is pivotally connected to the main portion of the fuselage so to be capable of turning downwardly.

In case antennae are disposed in the nose portion of the fuselage, it is desirable for the contour of the cross section of this portion of the fuselage to have the shape of a circumference.

A substantial advantage of the present invention in addition to the relatively high aerodynamic characteristics is that it provides for an essential decrease in the over-all dimensions of the aircraft.

The following detailed description of an exemplary embodiment of a supersonic aircraft according to the present invention is given with references to the accompanying drawings, in which:

DETAILED DESCRIPTION OF THE INVENTION

Figure 1:
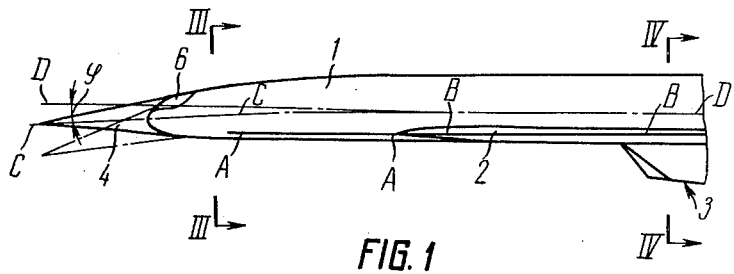
FIG. 1 is a fragmentary side view of a nose portion of the aircraft embodying the invention.
Figure 2:
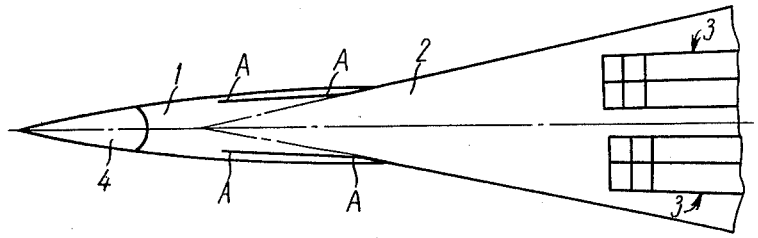
FIG. 2 is a bottom view of the aircraft shown in FIG. 1.
Figure 3:
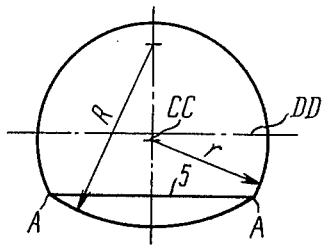
FIG. 3 is a view taken along line III—III of FIG. 1, the view looking in the direction of the arrows.

A supersonic aircraft comprises a fuselage 1 (FIGS. 1 and 2) having a fin portion of a conventional shape. Mounted in the lower portion of the fuselage 1 is a delta wing 2 and nacelles 3 accomodating engines and air intake ducts are located under the middle portion of the wing. The contour of the cross section of the nose portion of the fuselage, except for its end 4, is essentially two arcs of different circumferences (FIG. 3), disposed one above the other. The lower arc is described by a radius $R$, and the upper arc by a radius $r$, with the lower arc exceeding the upper arc by 1.3–1.7 times. The closer the section is to the end 4 (FIGS. 1 and 2), the smaller the ratio and the boundary between the two arcs is essentially a floor 5 of the cabin, with the width of the cross section exceeding the height.

Figure 4:
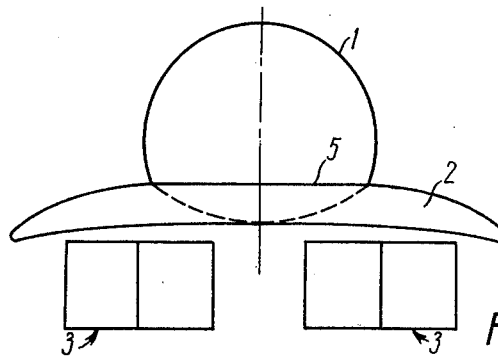
FIG. 4 is a view taken along line IV—IV of FIG. 1, the view looking in the direction of the arrows.

Such shape of the nose portion of the fuselage substantially increases its bearing characteristics during flights at supersonic speeds, so that it is unnecessary to dispose the nose portion of the fuselage above the wing, as is seen in FIG. 4. With the nose portion thus disposed, the operating conditions of the air intake ducts, as compared to conventional aircraft, are not worsened. With the flight speed varying from the subsonic to the supersonic, the aerodynamic center shifts but insignificantly.

Furthermore, by virtue of the invention it is possible to increase the number of seats in a row by one and, the area of the cross section of the passenger cabin remains the same.

It is clear that due to its asymmetric shape, different forces are applied to the upper and lower portions of the cross section. However, the difference in the forces is resisted by the cabin floor 5 which connects these portions.

Uniform conditions of the vortex formation, higher bearing characteristics of the wing, as well as relatively high characteristics of the longitudinal and directional stabilities of the aircraft are ensured by the fact that line A—A (FIGS. 1 and 2) of the intersection of the arcs of circumferences at each side smoothly fairs into leading edge B-B of the wing 2.

To increase the pilot's field of vision from a canopy 6 (FIG. 1) which does not protrude above the fuselage 1, longitudinal axis C—C of the sections of the nose portion of the fuselage at its end 4, as well as the end per se, are inclined downwardly at an angle $\phi$ relative to fuselage base line D—D. It is expedient to make the angle $\phi$ equal to the upwash angle, i.e. 4°–6°.

As the cockpit canopy 6 does not protrude, the aerodynamic resistance of the aircraft is considerably decreased, but the field of vision in the course of taking-off and landing decreases. This results from the fact that during these flight conditions, the aircraft is inclined relative to the horizon. To eliminate this difficulty, the end 4 of the fuselage is a separate component and is pivotally connected to the main portion of the fuselage so that at taking-off and landing the end 4 can be lowered.

To increase the strength of the end 4 in case it accomodates antenna or some other equipment, the contour of the cross section of the end has the shape of a circumference. Hence, an intermediate portion is provided between the cross section of the end having the shape of a circumference and disposed close to the main portion of the fuselage, and the cross section of the main portion of the fuselage having the shape of two arcs and which is the nearest to the end, with the shape of the intermediate portion providing for a smooth transistion of one of the sections into the other.

What we claimed is:

1. A supersonic aircraft comprising a fuselage having a front end, a base line, a fin portion and a nose portion, said nose portion having a front boundary and a rear boundary, the contour of the cross-section of the nose portion, except for the front end of the fuselage being defined by two circles of different radii, the circles being disposed one above the other, the radius of the lower circle being 1.3 to 1.7 greater than the radius of the upper circle, a cabin floor at the level of the intersection of the two circles serving as a boundary between the circles, the width of the cross-section exceeding the height whereby the bearing characteristics of the fuselage are improved and the aerodynamic center of the aircraft is shifted insignificantly when switching from subsonic speed to supersonic speed, a delta wing disposed in the middle portion of the fuselage, the wing having a front edge, engines under the middle portion of the wing, the intersection of the two circles gradually passing to the front edge of the wing at the sides of the nose portion of the fuselage to provide for uniform conditions of vortex formation, raise the bearing characteristics of the wing and the longitudinal and directional stability, the small limit referring to the front boundary of the nose portion and the greater limit to the rear boundary of the nose portion, and the longitudinal axis of the section of the nose portion of the fuselage at its front end and including the front end being inclined downwardly relative to the base line of the fuselage at an angle of 4° – 6° to increase the pilot's field of vision.

2. The aircraft as claimed in claim 1, in which the contour of the cross-section of the front end of the fuselage has the shape of a circumference.

\* \* \* \* \*